Feb. 4, 1936.   V. L. DU SANG   2,029,561

WHEEL BALANCING WEIGHT

Filed April 4, 1934

Inventor,
Virgil L. DuSang,
By
Minturn & Minturn,
Attorneys.

Patented Feb. 4, 1936

2,029,561

UNITED STATES PATENT OFFICE 2,029,561

WHEEL BALANCING WEIGHT

Virgil L. Du Sang, Kokomo, Ind.

Application April 4, 1934, Serial No. 718,915

3 Claims. (Cl. 301—5)

This invention relates to the art of balancing weights to be applied to rotating members particularly in automobile wheels. With the advent of high speed performance of automobiles and tires of considerable relative weight with large diameters, difficulty is frequently encountered in keeping the automobile traveling in a straight line. When a tire or a wheel on which the tire is mounted, or both, may be out of balance, the unbalanced condition of that wheel will cause the tire to tend to crawl causing one wheel to advance faster than the other so as to produce a turning effect particularly with the front wheels although the same effect may be observed with the rear wheels. It has been observed that in some cases the tires or the wheels may be so much out of balance that at speeds of 50 miles per hour or above, the unbalanced effect will be sufficient to cause the wheel to actually leave the ground during part of its revolution.

I am aware of the fact that weights have been employed to counteract the unbalanced effect, but considerable difficulty has been had with such known types of weights for this purpose in that the weights could not be applied easily to the wheel and when applied would lose off.

It is a primary purpose of my invention to provide a quickly attachable weight which will be safe and also very easily applied. It is a further primary object of my invention to provide such a weight attaching means as will permit the weight to grip the rim of a wheel with the tire thereon cooperating to retain the weight in place.

Figure 1:
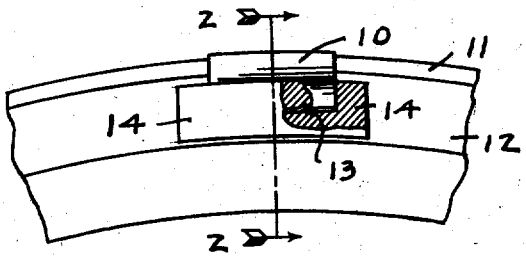
Figure 2:
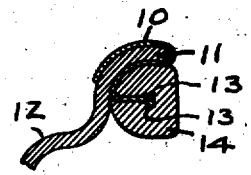
Figure 5:
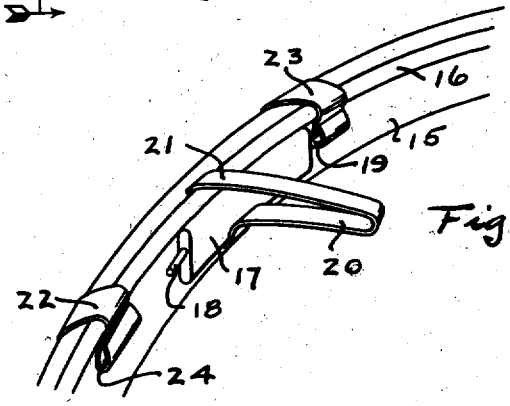
Figure 6:
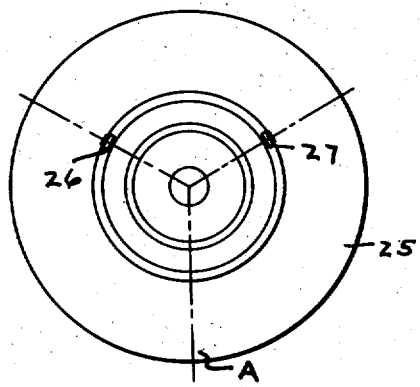
Figure 3:
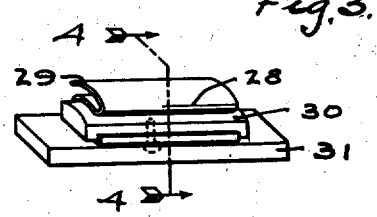
Figure 4:
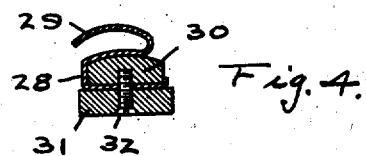

Other advantages and objects of the invention will become apparent to those versed in the art in the following description, with reference being made to the accompanying drawing, in which Fig. 1 is a fragmentary side elevation of a tire rim to which my invention is applied;

Fig. 2, a vertical section on the line 2—2 in Fig. 1;

Fig. 3, a view in perspective of a modified form of the invention;

Fig. 4, a section on the line 4—4 in Fig. 3;

Fig. 5, a view in perspective of a still further modified form of the invention; and Fig. 6, a side elevation of a wheel indicating the relative locations of weights.

Like characters of reference indicate like parts throughout the several views in the drawing.

Referring first to the form of the invention as shown in Figs. 1 and 2, I provide a spring steel metallic clip 10 substantially S-shape in cross section and having the upper loop thereof formed to fit snugly about the outer peripheral edge 11 of a tire rim 12. This upper loop is so formed that it will yieldingly grip over the edge 11 and will have to be driven in place. The lower outer end of the clip 10 is turned outwardly and is preferably cut to have barbs 13 along its outer edge. A mass of lead 14 is carried by the lower leg of the clip 10, being molded in place thereon so that the barbs 13 will prevent the lead from slipping thereoff. The lead 14 is molded so as to fit snugly around the lower portion of the clip 10 as best indicated in Fig. 2 and the outer face of the lead 14 preferably terminates in a vertical plane not beyond the outer portion of the clip 10. It is thus to be seen that the mass of lead 14 is carried snugly back under the outturned edge 11 of the tire rim so that under centrifugal force, the lead 14 tends to bear upwardly against the clip 10 which in turn bears against the under side of the outturned edge 11. With the mass of the lead carried back under the edge 11, there is no tendency for the lead to loosen up and fly off of the clip 10.

It is to be understood that this mass of lead 14 may vary in weight depending upon the weight required to correct the unbalanced condition of the wheel. In practice I supply these weights with the mass of lead 14 varying through a range of several ounces. It is to be noted that the upper inturned lip of the clip 10 passes well down over the top side of the edge 11 of the rim so that the tire carried on the rim will yieldingly grip at least the inner edge of the clip 10 to press it against the rim. These clips 10 may be entered over the edge 11 at any point around the rim 12 and then driven into place to become a fixed part of the wheel. It is understood that the wheel is allowed to revolve on some balancing device in the usual way to locate the heavier side thereof and that the weights are then applied on the opposite side to counteract that unbalanced weight.

In some cases a tire rim is encountered wherein there is but a very slight projection of the peripheral edge, and in this case I provide a weight of the type indicated in Fig. 5 which is flattened in nature to lie back under that slight extending edge. Referring to Fig. 5, the rim 15 has the overhanging edge 16. A weight 17 is formed to have pins 18 and 19 extending from its respective ends. The weight 17 is initially held in place by means of a clip 20 which grips the under side of the weight 17 and urges it up snugly against the under side of the overhanging edge 16 by means of an upper arm 21 which passes over the top of the edge 16. With the weight thus temporarily secured in place, the wheel is placed on some sensitive balancer and the weight 17 then adjusted circumferentially around the rim until the wheel is brought into balance.

When this position of the weight 17 is determined, a pair of clips 22 and 23 are placed over the edge 16 to have a lower looped portion 24 in each case extending back under the edge 16 to be in compressive contact with the vertical face of the rim 15 thereunder. These clips 22 and 23 are moved circumferentially along the rim to have their looped portions brought up and telescoped over the pins 18 and 19, the clip 23 being herein shown as just engaging the pin 19. After the clips 22 and 23 are thus positioned, the temporary clip 20 is removed. The weight of the clip 20 is made to be equal to the combined weights of the clips 22 and 23 so that the wheel is kept in balance after the clips 22 and 23 are attached to carry the weight 17 in service and after the temporary locating clip 20 has been removed.

It is preferable to use two or more weights on a wheel to overcome an unbalanced condition and such weights should be located in some such manner as indicated in Fig. 6 where the unbalanced portion of the wheel 25 is on the under side such as at A, that is, A indicates the heavier side of the wheel. Since that unbalanced weight may be distributed over an area rather than being located at a point, it is better to divide the weights as above indicated so as to use two or more. In Fig. 6 two such weights are indicated as being employed and they are located, one each a third of the way around from the heavy side A, that is the two weights 26 and 27 are spaced around one from the other 120°, and each is also spaced around from the heavy side 120°. The combined effect of the weights 26 and 27 is made by selecting the proper weight in each case to exactly balance the wheel.

Where it is not desired to employ weights fixed to the clips as in the form shown in Figs. 1 and 2, a type of structure as indicated in Figs. 3 and 4 may be employed wherein the clip 28 has an upper portion 29 adapted to be driven over the edge of the tire rim as in the case of the clip 10. The lower leg of the clip 28, however, is carried around and outwardly to a somewhat greater distance and is shaped to carry a mass of metal 30 between it and the upper portion of the clip. An additional mass of metal 31 is brought up against the under side of the lower leg and a screw 32 is passed through this lower piece of metal and the clip leg and screwthreadedly engaged in the metal 30. Thus by varying the dimensions of the lower metal 31, that is by having these pieces of metal 31 in varying sizes, the weight desired may be had by selecting that particular piece of metal 31 to give that weight. Of course the lower weight 31 may be even dispensed with entirely where the weight of the metal 30 is sufficient.

While I have herein shown and described my invention in the simplest and best forms as now known to me, it is obvious that structural changes may be made, particularly in the manner of securing the mass of metal to the clip, without departing from the spirit of the invention, and I, therefore, do not desire to be limited to those precise forms, nor any more than may be required by the following claims.

I claim:

1. For balancing a wheel having a rim with an edge extending upwardly and outwardly, the combination of a weight shaped to be confined substantially under the projection of said edge, and a clip carrying the weight and compressibly engaging over the edge to extend around and downwardly on the inner side thereof, said clip being made out of spring steel, and said weight being cast over a barbed foot of the clip.

2. For balancing a wheel having a rim with an edge extending upwardly and outwardly, the combination of a weight shaped to fit under said edge and against said rim, and a clip carrying the weight and elastically engaging over said edge to extend downwardly on the inner side thereof, a foot out-turned from the lower end of the clip having an opening cut therethrough, and said weight being formed around said foot and through said opening as a means of securing the weight to said clip.

3. For balancing a wheel having a rim with an edge extending upwardly and outwardly, the combination of a weight shaped to fit under said edge and against said rim, and a clip carrying the weight and elastically engaging over said edge to extend downwardly on the inner side thereof, a foot out-turned from the lower end of the clip having an opening cut therethrough, and said weight being formed around said foot and through said opening as a means of securing the weight to said clip, said clip being substantially S-shaped to carry around from said embedded foot over the weight and thence over said edge.

VIRGIN L. DU SANG.

---

CERTIFICATE OF CORRECTION.

Patent No. 2,029,561.     February 4, 1936.

VIRGIL L. DU SANG.

It is hereby certified that error appears in the above numbered patent requiring correction as follows: Page 2, end of specification, signature of patentee, for "Virgin L. Du Sang" read Virgil L. Du Sang; and that the said Letters Patent should be read with this correction therein that the same may conform to the record of the case in the Patent Office.

Signed and sealed this 7th day April, A. D. 1936.

Leslie Frazer (Seal)     Acting Commissioner of Patents.

wheel is placed on some sensitive balancer and the weight 17 then adjusted circumferentially around the rim until the wheel is brought into balance.

When this position of the weight 17 is determined, a pair of clips 22 and 23 are placed over the edge 16 to have a lower looped portion 24 in each case extending back under the edge 16 to be in compressive contact with the vertical face of the rim 15 thereunder. These clips 22 and 23 are moved circumferentially along the rim to have their looped portions brought up and telescoped over the pins 18 and 19, the clip 23 being herein shown as just engaging the pin 19. After the clips 22 and 23 are thus positioned, the temporary clip 20 is removed. The weight of the clip 20 is made to be equal to the combined weights of the clips 22 and 23 so that the wheel is kept in balance after the clips 22 and 23 are attached to carry the weight 17 in service and after the temporary locating clip 20 has been removed.

It is preferable to use two or more weights on a wheel to overcome an unbalanced condition and such weights should be located in some such manner as indicated in Fig. 6 where the unbalanced portion of the wheel 25 is on the under side such as at A, that is, A indicates the heavier side of the wheel. Since that unbalanced weight may be distributed over an area rather than being located at a point, it is better to divide the weights as above indicated so as to use two or more. In Fig. 6 two such weights are indicated as being employed and they are located, one each a third of the way around from the heavy side A, that is the two weights 26 and 27 are spaced around one from the other 120°, and each is also spaced around from the heavy side 120°. The combined effect of the weights 26 and 27 is made by selecting the proper weight in each case to exactly balance the wheel.

Where it is not desired to employ weights fixed to the clips as in the form shown in Figs. 1 and 2, a type of structure as indicated in Figs. 3 and 4 may be employed wherein the clip 28 has an upper portion 29 adapted to be driven over the edge of the tire rim as in the case of the clip 10. The lower leg of the clip 28, however, is carried around and outwardly to a somewhat greater distance and is shaped to carry a mass of metal 30 between it and the upper portion of the clip. An additional mass of metal 31 is brought up against the under side of the lower leg and a screw 32 is passed through this lower piece of metal and the clip leg and screwthreadedly engaged in the metal 30. Thus by varying the dimensions of the lower metal 31, that is by having these pieces of metal 31 in varying sizes, the weight desired may be had by selecting that particular piece of metal 31 to give that weight. Of course the lower weight 31 may be even dispensed with entirely where the weight of the metal 30 is sufficient.

While I have herein shown and described my invention in the simplest and best forms as now known to me, it is obvious that structural changes may be made, particularly in the manner of securing the mass of metal to the clip, without departing from the spirit of the invention, and I, therefore, do not desire to be limited to those precise forms, nor any more than may be required by the following claims.

I claim:

1. For balancing a wheel having a rim with an edge extending upwardly and outwardly, the combination of a weight shaped to be confined substantially under the projection of said edge, and a clip carrying the weight and compressibly engaging over the edge to extend around and downwardly on the inner side thereof, said clip being made out of spring steel, and said weight being cast over a barbed foot of the clip.

2. For balancing a wheel having a rim with an edge extending upwardly and outwardly, the combination of a weight shaped to fit under said edge and against said rim, and a clip carrying the weight and elastically engaging over said edge to extend downwardly on the inner side thereof, a foot out-turned from the lower end of the clip having an opening cut therethrough, and said weight being formed around said foot and through said opening as a means of securing the weight to said clip.

3. For balancing a wheel having a rim with an edge extending upwardly and outwardly, the combination of a weight shaped to fit under said edge and against said rim, and a clip carrying the weight and elastically engaging over said edge to extend downwardly on the inner side thereof, a foot out-turned from the lower end of the clip having an opening cut therethrough, and said weight being formed around said foot and through said opening as a means of securing the weight to said clip, said clip being substantially S-shaped to carry around from said embedded foot over the weight and thence over said edge.

VIRGIN L. DU SANG.

---

CERTIFICATE OF CORRECTION.

Patent No. 2,029,561.              February 4, 1936.

VIRGIL L. DU SANG.

It is hereby certified that error appears in the above numbered patent requiring correction as follows: Page 2, end of specification, signature of patentee, for "Virgin L. Du Sang" read Virgil L. Du Sang; and that the said Letters Patent should be read with this correction therein that the same may conform to the record of the case in the Patent Office.

Signed and sealed this 7th day April, A. D. 1936.

Leslie Frazer (Seal)                            Acting Commissioner of Patents.